United States Patent [19]

Radvan et al.

[11] Patent Number: 4,882,114

[45] Date of Patent: Nov. 21, 1989

[54] MOLDING OF FIBER REINFORCED PLASTIC ARTICLES

[75] Inventors: Bronislaw Radvan, Buckinghamshire, England; Anthony J. Willis, Bergen-Op-Zoom, Netherlands

[73] Assignee: The Wiggins Teape Group Limited, Basingstoke, England

[21] Appl. No.: 325,051

[22] Filed: Mar. 16, 1989

Related U.S. Application Data

[63] Continuation of Ser. No. 113,904, Oct. 29, 1987, abandoned, which is a continuation-in-part of Ser. No. 926,858, Nov. 4, 1986, abandoned, and Ser. No. 946,167, Dec. 23, 1986, Pat. No. 4,734,321, which is a continuation of Ser. No. 689,000, Jan. 4, 1986, abandoned, said Ser. No. 926,858, is a continuation of Ser. No. 688,712, Jan. 4, 1985, abandoned.

[30] Foreign Application Priority Data

Jan. 6, 1984 [GB] United Kingdom ............... 8400290
Jan. 6, 1984 [GB] United Kingdom ............... 8400292

[51] Int. Cl.⁴ ............................................. B29C 43/00
[52] U.S. Cl. ................................. 264/129; 264/86; 264/137; 264/257
[58] Field of Search ............... 264/102, 131, 136, 137, 264/257, 258, 510, 511, 512, 45.3, 109, 122, 86

[56] References Cited

U.S. PATENT DOCUMENTS

| | | |
|---|---|---|
| 1,875,018 | 0/1932 | Kliefoth . |
| 1,901,382 | 0/1933 | Stevenson . |
| 2,653,870 | 9/1953 | Kast . |
| 2,715,755 | 8/1955 | Jones . |
| 2,795,524 | 6/1957 | Rodman . |
| 2,892,107 | 6/1959 | Williams et al. ............... 310/8 |
| 3,200,181 | 1/1962 | Rudloff . |
| 3,216,841 | 11/1965 | Thellmann ............... 106/208 |
| 3,396,062 | 8/1968 | White ............... 156/244 |
| 3,428,518 | 0/1963 | Schafer . |
| 3,452,128 | 6/1969 | Rains ............... 264/126 |
| 3,489,827 | 1/1970 | Mueller et al. ............... 264/50 |
| 3,621,092 | 11/1971 | Hofer . |
| 3,734,985 | 5/1973 | Greenberg . |
| 3,832,115 | 8/1974 | Ettel ............... 425/373 |
| 3,837,986 | 9/1974 | Gorter et al. . |
| 3,850,723 | 11/1974 | Ackley ............... 156/180 |
| 3,856,614 | 12/1974 | Susuki et al. ............... 161/159 |
| 3,865,661 | 2/1975 | Hata et al. . |
| 3,891,738 | 6/1975 | Shen . |
| 3,897,533 | 0/1975 | Hani et al. . |
| 3,903,343 | 9/1975 | Pfaff ............... 428/168 |
| 3,930,917 | 1/1976 | Esakov et al. ............... 156/78 |
| 3,975,483 | 8/1976 | Rudloff . |
| 3,980,511 | 9/1976 | Proucelle ............... 156/62.4 |
| 3,980,613 | 9/1976 | Bachot et al. ............... 264/45.3 |
| 4,007,083 | 2/1977 | Ring et al. ............... 162/101 |
| 4,081,318 | 3/1978 | Wietsma . |
| 4,104,340 | 8/1978 | Ward . |
| 4,104,435 | 8/1978 | Ballesteros ............... 428/288 |
| 4,153,760 | 5/1979 | Sundberg et al. ............... 264/45.3 |
| 4,159,294 | 6/1979 | Oishi et al. ............... 264/45.3 |

(List continued on next page.)

FOREIGN PATENT DOCUMENTS 559853 7/1983 Australia .

(List continued on next page.)

OTHER PUBLICATIONS

1004 Abstracts Bulletin of the Institute of Paper Chemistry, vol. 53 (1982) Aug., No. 2, Appleton, Wis., U.S.A. "Polymer Processing", James M. McKelvey, 1962.

(List continued on next page.)

Primary Examiner—James Lowe
Attorney, Agent, or Firm—Burns, Doane, Swecker & Mathis

[57] ABSTRACT

A shaped article of fiber reinforced material is made by forming a foamed aqueous dispersion having single discrete fibers, and unconsolidated particulate thermoplastic or thermosetting material, laying down and draining the dispersion to form a web, transferring the web to an oven and heating it to form a self-sustaining permeable sheet, transferring the sheet to a through-air heating oven, passing heated air through the sheet to cause substantially uniform and homogeneous heating of the thermoplastic component, transferring the heated sheet to a compression mold, and subjecting the sheet to compression molding to form a shaped fiber reinforced plastic article.

16 Claims, 4 Drawing Sheets

4,882,114

Page 2

U.S. PATENT DOCUMENTS

| | | | |
|---|---|---|---|
| 4,178,411 | 12/1979 | Cole et al. | |
| 4,234,652 | 11/1980 | Vanoni et al. | |
| 4,242,404 | 12/1980 | Bondoc et al. | |
| 4,273,981 | 6/1981 | Nopper et al. | |
| 4,327,164 | 4/1982 | Feinberg et al. | 429/144 |
| 4,339,490 | 7/1982 | Yoshioka et al. | 428/213 |
| 4,359,132 | 11/1982 | Parker et al. | 264/126 |
| 4,362,778 | 12/1982 | Andersson et al. | |
| 4,383,154 | 7/1983 | Tyler et al. | |
| 4,386,943 | 6/1983 | Gumbel et al. | |
| 4,399,085 | 8/1983 | Belbin et al. | |
| 4,426,470 | 1/1984 | Wessling et al. | |
| 4,440,819 | 4/1984 | Rosser et al. | |
| 4,451,539 | 5/1984 | Vallee et al. | |
| 4,469,543 | 9/1984 | Segal et al. | 156/283 |
| 4,481,248 | 11/1984 | Fraige | 428/283 |
| 4,495,238 | 1/1985 | Adiletta | |
| 4,498,957 | 2/1985 | Sasaki et al. | |
| 4,503,116 | 3/1985 | Lapidus | |
| 4,508,777 | 4/1985 | Yamamoto et al. | |
| 4,512,836 | 4/1985 | Tucci | |
| 4,543,288 | 4/1985 | Radvan et al. | |
| 4,562,033 | 12/1985 | Johnson et al. | |
| 4,568,581 | 2/1986 | Peoples, Jr. | 428/35 |
| 4,595,617 | 6/1986 | Bogdany | 428/95 |
| 4,643,940 | 2/1987 | Shaw et al. | |
| 4,649,014 | 3/1987 | Tochikawa | 264/555 |
| 4,659,528 | 4/1987 | Plowman et al. | 264/49 |
| 4,663,225 | 5/1987 | Farley et al. | 428/290 |
| 4,670,331 | 6/1987 | Radvan et al. | |
| 4,690,860 | 9/1987 | Radvan et al. | 428/290 |
| 4,719,039 | 1/1988 | Leonardi | 252/511 |
| 4,734,321 | 3/1988 | Radvan et al. | 428/283 |

FOREIGN PATENT DOCUMENTS

| | | |
|---|---|---|
| 0148760 | of 0000 | European Pat. Off. |
| 0173382 | of 0000 | European Pat. Off. |
| 0071219 | of 1983 | European Pat. Off. |
| 0152994 | 8/1985 | European Pat. Off. |
| 24181Q | of 0000 | Fed. Rep. of Germany |
| 3420195 | 12/1985 | Fed. Rep. of Germany |
| 1040359 | of 0000 | France |
| 1529133 | of 1968 | France |
| 1553537 | 1/1969 | France |
| 2475970 | of 1981 | France |
| 56-37373 | of 1981 | Japan |
| 462024 | of 1968 | Switzerland |
| 703023 | of 0000 | United Kingdom |
| 843154 | of 0000 | United Kingdom |
| 1008833 | of 0000 | United Kingdom |
| 1110659 | of 0000 | United Kingdom |
| 1113792 | of 0000 | United Kingdom |
| 1129757 | of 0000 | United Kingdom |
| 1305982 | of 0000 | United Kingdom |
| 1306145 | of 0000 | United Kingdom |
| 1329409 | of 0000 | United Kingdom |
| 1348896 | of 0000 | United Kingdom |
| 1424682 | of 0000 | United Kingdom |
| 2065016 | of 0000 | United Kingdom |
| 2096195 | of 0000 | United Kingdom |
| 448138 | of 1936 | United Kingdom |
| 729381 | of 1955 | United Kingdom |
| 855132 | 11/1960 | United Kingdom |
| 871117 | of 1961 | United Kingdom |
| 1058932 | 2/1967 | United Kingdom |
| 1134785 | 11/1968 | United Kingdom |
| 1198324 | of 1970 | United Kingdom |
| 1204039 | 9/1970 | United Kingdom |
| 1230789 | 5/1971 | United Kingdom |
| 1231937 | 5/1971 | United Kingdom |
| 1263812 | 2/1972 | United Kingdom |
| 1330485 | of 1973 | United Kingdom |
| 1412642 | 11/1975 | United Kingdom |
| 2051170 | 1/1981 | United Kingdom |
| 2093474 | 9/1982 | United Kingdom |

OTHER PUBLICATIONS

"Paints and Varnishes–Determination of Flow Time by Use of Flow Cups", International Standard ISO 2431, 1984.

"Part A6, Determination of Flow Time by Use of Flow Cups", British Standards Institution, 1984.

"Fibre Foam", Turner & Cogswell, 1976, presented at VIIth International Congress on Rheology in Sweden, Aug. 23–Aug. 27, 1976.

MOLDING OF FIBER REINFORCED PLASTIC ARTICLES

CROSS-REFERENCE TO RELATED APPLICATIONS

This application is a continuation of application Ser. No. 07/113,904, filed Oct. 29, 1987 now abandoned, which in turn was a continuation-in-part of two copending applications: (a) Ser. No. 926,858, filed Nov. 4, 1986, now abandoned; which is a continuation of Ser. No. 688,712, filed Jan. 4, 1985, now abandoned; which in turn claims foreign priority from U.K. Application No. 84 00292, filed Jan. 6, 1984; and (b) Ser. No. 946,167, filed Dec. 23, 1986, now U.S. Pat. No. 4,734,321; which is a continuation of Ser. No. 689,000, filed Jan. 4, 1986, now abandoned; which in turn claims foreign priority from U.K. Application No. 84 00290, filed Jan. 6, 1984.

BACKGROUND OF THE INVENTION

This invention relates to molded articles of fiber reinforced synthetic plastics material and to a process of molding such articles.

Plastics sheet materials made from thermoplastic resins are widely used in the manufacture of molded articles. Such materials are, however, not of great strength or rigidity, and where such properties are required, fiber reinforcement is introduced.

Thus, for example, in the manufacture of one such materials, layers of glass fiber mat are interposed between layers of thermoplastics material, the composite structure being needled to produce a degree of integration of the layers and then heated under pressure to produce consolidated rigid sheets for use in molding.

For the satisfactory molding of such sheets, they must be homogeneously preheated. This requires both time and accurate temperature control if overheating and degradation of the sheet surfaces is not to occur whilst the core portions of the sheets are brought up to the required molding temperature. Such materials do not lend themselves easily to deep draw molding.

Also, for a molding of given dimensions, an optimum size of consolidated sheet is required if excessive waste in the form of flash is to be avoided. As a result a molder who manufactures a wide range of moldings must carry a corresponding range of sheet sizes, be prepared to cut large sheets to an appropriate size or accept a high degree of wastage.

Furthermore, when used for deep draw molding it is found that such materials are not capable of being used to form moldings of uniform structural strength. This is because the glass fiber mat is constituted of very long glass fiber strands (i.e. fiber bundles) of perhaps 200 centimeters or more which extend in a random serpentine manner throughout the whole sheet. This substantially restricts their movement during molding in that they cannot flow with the thermoplastics material constituting the remainder of the structure. As a result, relatively thin parts of the molding such as stiffening ribs are starved of fiber reinforcement. Additionally, because of the mode of manufacture of such reinforced sheets, they have to be fully consolidated by the application of heat and pressure in order to be transportable. As a result, they can only be supplied to the molder as flat, impermeable and rigid sheets which are difficult to handle in a continuous molding process.

It is among the objects of the present invention to provide a composite fiber and plastics material and process for the molding of fiber reinforced plastics articles which overcomes or alleviates the disadvantages of known materials as described above.

U.S. continuation application Ser. No. 689,000, now abandoned, describes and claims an air permeable sheet-like structure consisting essentially of 20% to 60% by weight of single discrete reinforcing fibers having a modulus of elasticity higher than 10000 Mega Pascals, and being between about 7 and about 50 millimeters long, and 40% to 80% by weight of unconsolidated particulate plastics material, selected from the group consisting of a thermoplastic and a thermosetting plastic material, the particulate plastics material having a particle size less than about 1.5 millimeters, and in which the fibrous and plastics components are bonded into an air permeable structure with the particulate plastics material retaining its particulate form in the air permeable structure, and the subject matter disclosed in this application Ser. No. 689,000, now abandoned, is incorporated by reference herein.

According to the present invention a process for making a shaped article of fiber reinforced synthetic plastics material comprises the steps of forming a foamed aqueous dispersion comprising from 20% to 60% by weight of single discrete fibers having a modulus of elasticity higher than 10000 mega pascals, and between 7 and 50 millimeters long, and from 40% to 80% by weight of unconsolidated particulate plastics material selected from the group consisting of a thermoplastic material and a thermosetting material, the particulate plastics material having a particle size of less than about 1.5 millimeters;

laying down and draining said dispersion on a foraminous support so as to form a web;

transferring said web to a heating oven;

heating said web first so as to remove residual moisture therefrom and then so as to bond the fibrous and plastics components together into a self-sustaining permeable sheet while substantially maintaining the particulate form of the plastics material;

transferring said self-sustaining sheet to a through air heating oven;

passing heated air through said sheet so as to cause substantially uniform and homogeneous heating of the components thereof to a temperature at which the viscosity of the thermoplastic constituting the particulate component is sufficiently low to permit the sheet to be molded into a shaped article;

transferring said heated permeable sheet to a compression mold; and, subjecting said sheet to compression molding at a predetermined pressure so as to form a shaped fiber reinforced plastic article.

The heating oven can be in the form of a through air heating oven.

Where glass fibers are used, and are received in the form of chopped strand bundles, the bundles are broken down into single fibers before the structure is formed.

A high modulus of elasticity is to be taken as meaning a modulus of elasticity substantially higher than that of a consolidated sheet which could be formed from the structure. Fibers falling into this category include glass, carbon and ceramic fibers and fibers such as the aramid fibers sold under the trade names Kevlar and Nomex and will generally include any fiber having a modulus higher than 10,000 Mega Pascals.

Bonding may be effected by utilizing the thermal characteristics of the plastics material within the structure. Thus the structure may be heated sufficiently to cause a thermoplastic component to fuse at its surfaces to adjacent particles and fibers. Or a post formable thermosetting component may be so heated to produce a similar effect. Care must be taken however to ensure that the conditions of heating are such as to prevent degradation of the plastics material after bonding.

Alternatively, a binder may be added during manufacture of the structure to effect bonding. Any binder may be used which will effect a bond at a lower temperature than that which would result in consolidation of the plastics material within the structure. Suitable binders include polyvinyl alcohol, polyvinyl acetate, carboxymethyl cellulose and starch.

Individual fibers should not be shorter than about 7 millimeters, since shorter fibers do not provide adequate reinforcement in the ultimate molded article. Nor should they be longer than 50 millimeters since such fibers are difficult to handle in the preferred manufacturing process for the fibrous structure.

Preferably glass fibers are 13 microns in diameter or less. Fiber of diameters greater than 13 microns will not so efficiently reinforce the plastics matrix after molding.

Preferably, the plastics material is in a particulate form and may be a thermoplastic, a thermosetting plastic or a mixture of the two. Suitable thermoplastics include polyethylene, polypropylene, polystyrene, acrylonitrylstyrene butadiene, polyethylene terephthalate, and polyvinyl chloride, both plasticized and unplasticized. It is anticipated that any thermoplastics powder may be used which is not chemically attacked by water and which can be sufficiently softened by heat to permit fusing and/or molding without being chemically decomposed.

Plastics powders need not be excessively fine, but particles coarser than about 1.5 millimeters, as exemplified by coarse sand or fine rice grains, are unsatisfactory in that they do not flow sufficiently during the molding process to produce a homogeneous structure.

The use of larger particles results in a significant reduction in the flexural modulus of the material when consolidated. Preferably the plastics particles are not more than 1 millimeter in size.

Because the structure is permeable, it is capable of being preheated by hot air permeation. This technique permits rapid homogeneous heating of the whole structure in a manner which is difficult to achieve with consolidated sheets.

The degree of bonding can be controlled to cohere the components whilst still retaining sufficient flexibility to permit the structure to be reeled. In the reeled condition, it can be transported readily for use to the mold in a continuous preheating and molding process. Alternatively, and to minimize material wastage, shaped elements may be cut, pressed or stamped from the structure and supplied to the mold in a form permitting articles to be molded with minimum flash to be disposed of. The residual material may be recycled through the forming process, and neither the molder nor the manufacturer of the fibrous structure will be faced with the need to dispose of waste material.

Alternatively, the degree of bonding may be such as to produce a rigid, but still air permeable sheet where this will meet the molder's requirements. This is effected by adjusting the amount of the degree of fusing of the thermoplastic, or the amount of binder added to achieve the desired effect, the adjustment depending on the kinds of thermoplastics or binders used.

After preheating, the structure may simply be molded into an impermeable article. Alternatively, it may be subjected to limited compression in the mold so as to remain permeable. Or it may be fully compressed in the mold so as to cause the molten thermoplastics material to wet the fibers. The mold is then slightly opened so as to allow the material to expand as a result of the resilience of the fibers and become permeable as described and claimed in U.S. Pat. No. 4,670,331 the subject matter discussed in that Patent being incorporated by reference herein. In certain cases, and especially when a smooth or glazed surface finish is required, the structure may be impregnated with a liquid thermosetting resin before or after molding as described and claimed in U.S. Pat. No. 4,690,860 the subject matter disclosed in that Patent being incorporated by reference herein.

The porosity of the structure permits the optional introduction of liquid thermosetting resin by surface coating or impregnation. Such resins must, of course, be of the slow curing or post formable kind so as to permit delivery to the molder and molding before curing occurs.

The structure may be rapidly heated by the heated air to the molding temperature of the thermoplastic component. The sheet will then be quickly transferred to the molding press and pressed into the desired shape before the curing of the thermosetting resin is complete.

The impregnation may be complete, in which a dense article will result or it may be limited to the surface layers of the article. This may confer sufficient increase in stiffness over the original expanded thermoplastic, together with a sealed surface which prevents a further ingress of other fluids such as water or oil into the expanded central zone. An excess of liquid thermosetting materials on the surface may also be used to produce a very smooth glossy appearance which is desirable when the molding is to be used as a substitute for sheet metal and which is very difficult to achieve with conventional fiber reinforced materials.

Thermosetting resins which may be used to impregnate the expanded thermoplastics sheet include phenolic and polyester resins, for example phenol-formaldehyde resin, urea and melamine formaldehyde resins, epoxy resins, unsaturated polyesters and polyurethanes. Post formable thermosetting materials may also be used.

In those cases where the molder is only equipped to handle consolidated sheets, the fibrous structure may be consolidated by cutting into appropriate lengths and then heating and cooling under pressure. It will be appreciated that such consolidation can only be carried out when the plastics content of the sheet is wholly of thermoplastics material.

In all cases however, after the web has been formed it is treated, usually by heating, to effect bonding without substantially consolidating the plastics particles held in the web. Slight metering may be effected to ensure that the structure produced has a constant thickness. However, pressure and temperature conditions must be less than those which would compact the web and consolidate any thermoplastic component or cure any thermosetting component which it may contain.

The invention also includes a process for making a shaped article of fiber reinforced synthetic plastics material comprising the steps of forming a foamed aqueous dispersion comprising from 20% to 60% by weight of single discrete fibers having a modulus of elasticity higher than 10000 megapascals, and between 7 and 50 millimeters long, and from 40% to 80% by weight of unconsolidated particulate plastics material selected from the group consisting of a thermoplastic material and a thermosetting material, the particulate plastics material having a particle size of less than about 1.5 millimeters;

laying down and draining said dispersion on a foraminous support so as to form a web; transferring said web to a through air heating oven;

passing heated air through said web, first so as to remove residual moisture and then so as to cause substantially uniform and homogeneous heating of the components thereof to a temperature at which the viscosity of the thermoplastic constituting the particulate component is sufficiently low to permit the web to be molded into a shaped article;

transferring said heated web to a compression mold; and, subjecting said web to compression molding at a predetermined pressure so as to form a shaped fiber reinforced plastic article.

A convenient process according to the invention includes heating the sheet in an oven in which the sheet is located between open supports through which hot air is passed.

BRIEF DESCRIPTION OF THE DRAWINGS

The invention will now be further described with reference to the accompanying drawings in which like reference numerals have been applied to like elements and wherein.

DESCRIPTION OF THE PREFERRED EMBODIMENTS

Figure 1:
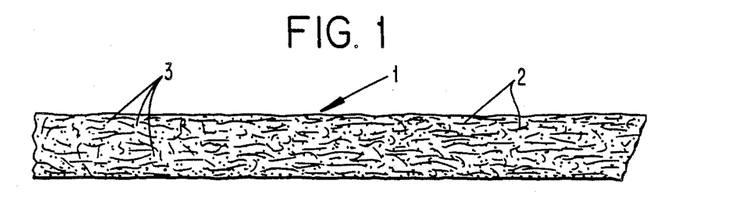
FIG. 1 is a diagrammatic cross-section through an open permeable structure of the kind made in the opening stages of the present invention.

Referring first to FIG. 1, this shows an uncompacted fibrous structure 1 comprising fibers 2 interspersed with particulate plastics material 3, the fibers and plastics particles being bonded together so as to form a coherent but permeable structure.

Typically, the fibers are glass fibers 12 millimeters long and 11 microns in diameter, the binder is polyvinyl alcohol and the plastics material is polypropylene particles.

Figure 2:
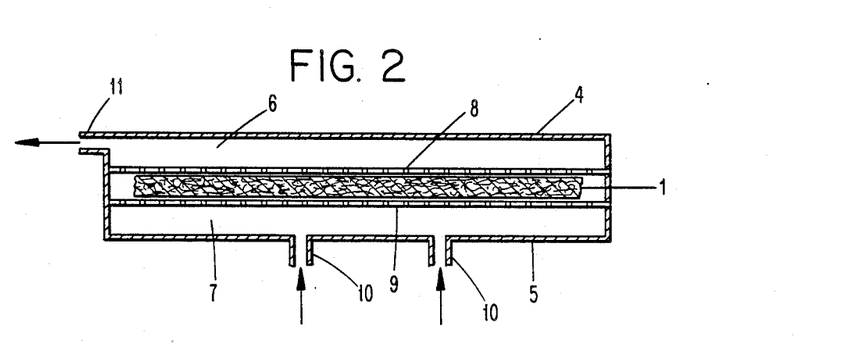
FIG. 2 is a sectional side elevation through a through air heating oven for use in the process of the invention.

FIG. 2 shows an oven for heating a permeable structure 1 of the kind shown in FIG. 1. The oven consists of an upper part 4 and a lower part 5, the parts 4 and 5 including plenum chambers 6 and 7 respectively. The lower wall of the part 4 and the upper wall 9 of the part 5 consist of grilles which facilitate the substantially unrestricted passage of air.

In order to heat the structure 1, hot air is introduced into the plenum chamber 7, passes through the grill 9, the structure 1 and the grill 8 and is then vented through the duct 11 from the plenum chamber 6.

Figure 3:
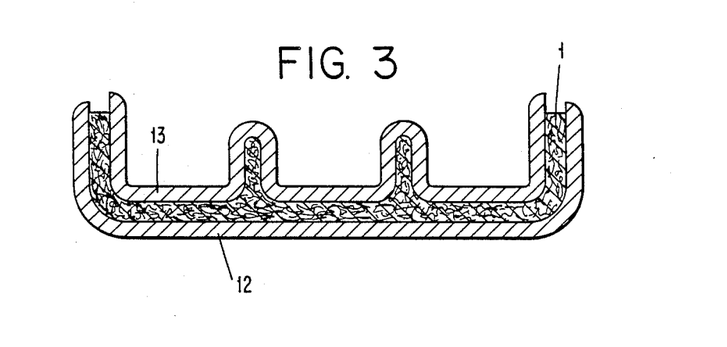
FIG. 3 is a sectional side elevation through a mold showing a molding being formed in accordance with the process of the invention.

After heating as described to, say, 200° C., the structure 1 is transferred to a mold, typically of the kind shown in FIG. 3.

Referring now to FIG. 3, this shows a mold having an upper part 13 and a complementary lower part 12 between which the structure 1 has been molded. Before or after the heating step has been effected the structure 1 may be impregnated with a liquid thermosetting resin which cures, at least partially, whilst the structure is in the mold.

The mold may be used to fully consolidate the structure so that resulting molding is solid and impermeable. Or the molding may be partially compacted so as to remain porous. Alternatively, a porous article can be achieved by partly or fully compacting and consolidating the article and then opening the mold slightly so as to allow the resilience of the glass fiber content to expand the molding to the desired thickness.

Suitable thermoplastics include polyethylene, polypropylene, polystyrene, acrylonitrylstyrene butadiene, polyethylene terephthalate, and polyvinyl chloride, both plasticized and unplasticized. It is anticipated that any thermoplastics material may be used which is not chemically attacked by water and which can be sufficiently softened by heat without being chemically decomposed.

Thermosetting materials which may be used to impregnate the structure include phenolic and polyester resins, for example phenol formaldehyde resin, urea and melamine formaldehyde resins, epoxy resins, unsaturated polyesters and polyurethanes.

A sheet of lightly bonded unconsolidated permeable material comprising 33% single glass fibers 13 millimeters long and 11 microns in diameter, 67% polypropylene powder together with a proprietary antioxidant, and having a substance of 3,000 grams per square meter was placed in a through drying oven manufactured by Honeycomb Engineering Co. Hot air at 230° C. was fed to the upper face of the sheet and a partial vacuum applied to the under side. The porous nature of the sheet mat allowed hot air to pass through it so uniformly heating the material. After a short time (about 6 secs), the still porous material was fully heated to the air temperature of 230° C. This temperature, being some 50° C. higher than the melting point of polypropylene, allowed the mat to be quickly removed from the oven and molded into shape. During heating of the mat it was noted that pressure drop across the thickness of the material was substantially constant, being 76 cm water gauge to start and rising to 85 cm water gauge at completion of heating.

A further example utilized material containing 50% glass (13 millimeters long, 11 microns diameter as before), 50% polypropylene powder+antioxidant. The heating time was about 4 seconds with the pressure drop being the same as in the previous examples.

This ability to heat a porous unconsolidated web has a number of significant advantages:

(a) Saving in processing time and cost since manufacture is eliminated.

(b) A more rapid heating of material prior to the molding operation; approximately 6 seconds opposed to 3 minutes for a consolidated sheet in an infra red oven.

(c) The development of a better temperature gradient throughout the thickness of the material, since the passage of hot air heats the mat uniformly through its thickness whilst infrared heating of a consolidated sheet develops a temperature profile from the surface to the center with risk of thermal degradation of plastic at the surface before the center has attained the desired temperature.

(d) Blanks can be cut from the unconsolidated mat prior to heating and the "waste" material readily "repulped" for re-use. Whereas waste arising from blanks cut from consolidated sheet must be ground at much higher cost into a particulate form for re-use.

Figure 4:
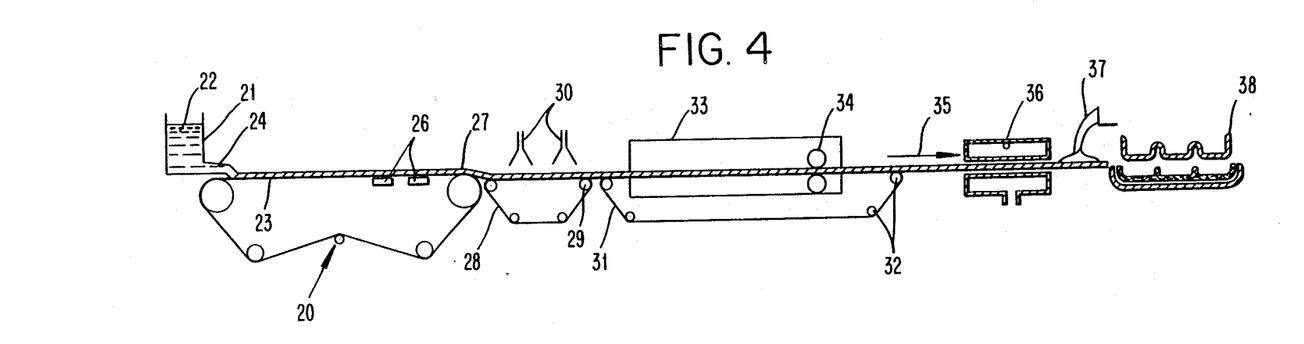
FIG. 4 is a diagrammatic side elevation of an apparatus for carrying out a process of the invention.

FIG. 4 shows an apparatus for making a fibrous structure according to the preferred method of the invention. There is shown at 20, the wet end of a Fourdrinier type papermaking machine including a headbox 21 which contains a dispersion 22. The dispersion 22 consists of glass fibers and particulate polypropylene in a foamed aqueous medium. A suitable foaming agent consists of sodium dodecylbenzene sulphonate at a concentration of 0.8% in water.

After drainage on the Fourdrinier wire 23 with the aid of suction boxes 26, a web 27 is formed of unbonded glass fibers interspersed with polypropylene particles. This is carefully transferred from the Fourdrinier wire 23 to a short endless wire mesh belt 28 tensioned around rollers 29. The belt 28 carries the web 27 under sprays 30 which apply liquid binder. Optionally, the binder may be applied by means of a curtain coater of known design. The web is then transferred to an endless travelling band 31 of stainless steel tensioned around rollers 32 and which carries the web through a drying tunnel 33. This causes residual moisture to be driven off and the binder to bond the fibers together. Towards the end of the drying tunnel, the web 27 is taken through a pair of rolls 34, whose function is to control the thickness of the resulting fibrous structure without applying pressure. The resulting sheet material is then taken in the direction of the arrow 35 and passes through air heating oven 36 of the kind shown in FIG. 3 whence it passes directly to a mold 38 of the kind shown in FIG. 3. The sheet material can be impregnated with a liquid thermosetting resin as indicated at 37 if desired.

Example 1

12 kg of polypropylene powder (PXC 8609 grade made by I.C.I. Ltd.) and 4 kg of glass fiber (E.C. grade) 13 $\mu$m diameter, 12 mm long, were mixed with 1600 liters of water in a froth flotation cell (Denver Equipment Co.) as described in U.K. Patent Nos. 1 129 757 and 1 329 409. Sufficient foaming agent (sodium dodecyl benzene sulphonate) was added to produce a fine bubbled foam with an air content of approximately 67% by volume. The foamed dispersion was then transferred to the headbox 11 of the apparatus shown in FIG. 3.

The suspension was deposited onto the Fourdrinier wire 13 of a paper machine, and the water drained using the suction boxes 16. The fibrous web was transferred onto the endless band 21 of polyester via the belt 18, but without the application of binder, then dried in the tunnel drier 23 at 105° C. and passed to the hot air oven and then molded.

Figure 6:
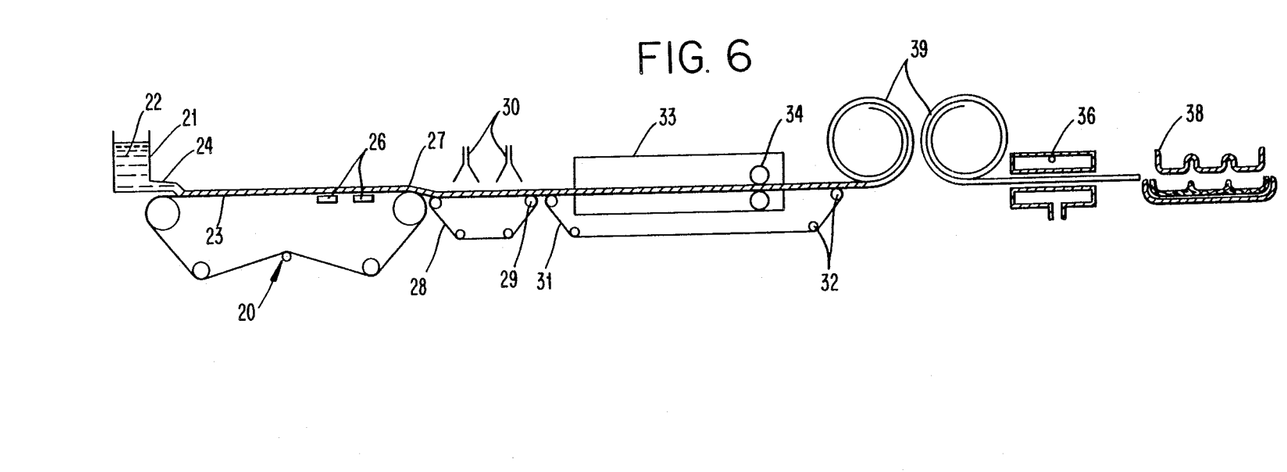
FIGS. 6, 7 and 8 are diagrammatic side elevations of apparatus for carrying out alternative processes according to the invention.

In the arrangement shown in FIG. 6 the same reference numerals are used to indicate similar parts but in this method of producing material the web 27 is formed into a roll 39 after it emerges from the drying tunnel 33. The roll 39 is then subsequently passed through the hot air oven 36 and into the mold 38. This process is convenient if there is a space problem in the production line and allows, what is in effect, a continuous process to be broken into two stages. The material emerging from the drying tunnel 33 has sufficient strength to allow it to be reeled.

Example 2

A continuous web of 50% chopped strand glass fiber 11 $\mu$m diameter and 13 millimeters long and 50% powdered polypropylene by weight were used to prepare a foamed dispersion generally as described in Example 1. This dispersion was then used to form a web on the wet end of a 1.1 meter wide paper-making machine. The 450 g/m moist web was produced at a speed of 8 m/min and impregnated by coating on the wire 18 with a 1% polyvinyl alcohol solution to act as a binder. The web was then passed directly into a tunnel dryer 23. The first section of the dryer was set at 105° C. in order to gently dry the web, although the subsequent three sections were set to 150°-160° C., i.e., below the melting point of the polypropylene. The emerging material, consisting of polypropylene particles retained in a web of separate glass fibers bonded together had sufficient strength to be reeled up and could be transported without disintegration or serious loss of polypropylene powder.

The reels of material were subsequently fed into a hot air oven and molded.

Example 3

The process of Example 1 was carried out until the web was deposited on the endless band 31. A binder consisting of acrylic latex diluted to 0.75% solids was then applied by means of a conventional curtain coated (not shown) onto the moving web. Excess latex solution was drawn through the web and recirculated. The web had a substance of 500 grams per square meter and 33 liters per meter of latex was applied as the web moved at 9 meters per minute on the endless band, 2 liters being retained in each 9 meter length of the web. The material was then heated in a hot air oven and satisfactorily molded.

Table 1 lists Examples 4 to 10 in which sheets were prepared generally in accordance with the process described in Example 1 using the various fibers specified in a matrix formed of polypropylene particles of less than 1 millimeter in size, the Table showing their properties prior to heating in the hot air oven for molding.

Table 2 lists Examples 11 to 21 in which sheets were prepared generally in accordance with the process described in Example 1 using a variety of fibers in matrixes formed from three differing thermoplastic polymers, again prior to heating in the hot air oven.

The various Examples demonstrate the versatility of the invention and its applicability for use with a wide range of reinforcing fibers and thermoplastics.

Figure 5:
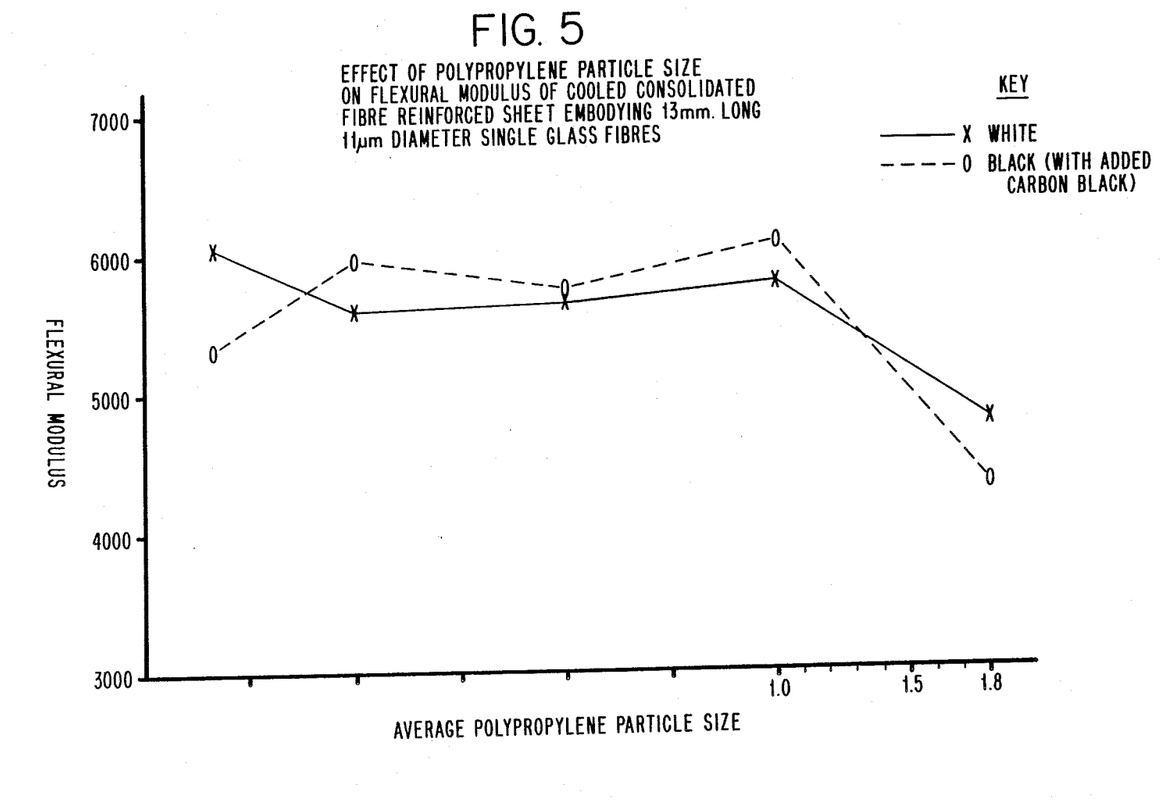
FIG. 5 is a graph illustrating a feature of the invention.

FIG. 5 is a graph demonstrating the effect of thermoplastic particle size on the flexural modulus of consolidated sheets, the horizontal axis not being to a consistent scale for clarity of illustration. The graph shows that the flexural modulus begins to fall when the particle size is larger than 1 millimeter. Beyond 1.5 millimeters in size the flexural modulus deteriorates significantly.

TABLE 1

THE EFFECT OF VARIOUS REINFORCING FIBERS ON A COOLED POLYPROPYLENE MATRIX AFTER CONSOLIDATION UNDER HEAT AND PRESSURE

| EXAMPLE | % FIBER COMPONENT | GRAMMAGE (g/m$^2$) | DENSITY (g/cc) | TENSILE STRENGTH (MPa) | FLEXURAL MODULUS (MPa) | FLEXURAL STRENGTH (MPa) | CHARPY NOTCHED IMPACT (kJ/m$^2$) |
|---|---|---|---|---|---|---|---|
| 4 | 8% vol. (20% wt.) Glass | 2415 | 0.99 | 47 | 3,425 | 59 | 14.6 |
| 5 | 19% vol. (40% wt.) Glass | 2705 | 1.15 | 72 | 5,215 | 79 | 8.6 |
| 6 | 35% vol. (60% wt.) Glass | 3130 | 1.38 | 75 | 7,475 | 78 | 13.4 |
| 7 | 8% vol. (15% wt.) Carbon | 2480 | 0.95 | 83 | 6,290 | 97 | 18.0 |
| 8 | 35% vol. (52% wt.) Carbon | 2960 | 1.10 | 145 | 13,630 | 101 | 32.5 |
| 9 | 8% vol. (12% wt.) Aramid | 2175 | 0.96 | 50 | 2,480 | 35 | 26.9 |
| 10 | 35% vol. (46% wt.) Aramid | 2915 | 1.01 | 145 | 6,130 | 94 | >75 |

| FIBER LENGTH | FIBER DIAMETER | FIBER DENSITY |
|---|---|---|
| 13 mm, | 11 μm, | 2.55 g/cc |
| 15 mm, | 8 μm, | 1.8 g/cc |
| 12 mm, | 12 μm, | 1.44 g/cc |

Notes:
1. Glass - Owens Corning R18D
2. Carbon - Courtauld Hysol Grafil 8821/1
3. Aramid - Dupont Kevlar K29
4. Polypropylene - Hoechst Hostalen PP.1402
vol. = by volume
wt. = by weight
g/m$^2$ = grams per square meter
g/cc = grams per cubic centimeter
MPa = Mega Pascals
kJ/m$^2$ = Kilo Joules per square meter
mm = millimeters
μm = microns

TABLE 2

EFFECT OF USING THERMOPLASTICS OTHER THAN POLYPROPYLENE

| EXAMPLE | COMPOSITE | GRAMMAGE (g/m$^2$) | TENSILE STRENGTH (MPa) | FLEXURAL MODULUS (MPa) |
|---|---|---|---|---|
| 11 | 20% wt glass in PET | 3000 | 74 | 6100 |
| 12 | 20% wt carbon in PET | 2075 | 121 | 10860 |
| 13 | 40% wt glass in PET | 3000 | 150 | 10700 |
| 14 | 20% wt glass in PPO | 2500 | 76 | 4300 |
| 15 | 40% glass in PPO | 2500 | 116 | 7000 |
| 16 | 50% wt glass in PPO | 2500 | 147 | 8600 |
| 17 | 15% wt carbon in PPO | 2025 | 79 | 6750 |
| 18 | 20% wt carbon in PPO | 2115 | 118 | 9900 |
| 19 | 32% wt carbon in PBT | 1850 | 144 | 18890 |
| 20 | 28% wt glass / 10% wt carbon in PBT | 1890 | 155 | 13530 |
| 21 | 40% wt glass in PBT | 1940 | 117 | 10290 |

PET = Polyethylene Terephthalate
PBT = Polybutylene Terephthalate sold as "Orgator TMNO" by Atochem UK
PPO = Polyphenylene Oxide sold as "NORYL" by General Electric
Units and fiber dimensions as in TABLE 1

Example 22

A polypropylene slurry was prepared by dispersing particulate polypropylene having a particle size of less than 1 millimeter in water at 25% solids content in a high shear mixer with a dispersing agent sold under the trade name "Catafix".

The resulting slurry was then further diluted to 7% solids and supplied to the inlet of a fan pump feeding stack to a rotiformer (Registered Trade Mark). Single glass fibers 11 micron diameter, 13 millimeters long were simultaneously fed to the fan pump inlet at a ratio of 40% by weight of the polypropylene.

The sheet formed on the rotiformer was then spray treated with an acrylic latex binder diluted to 0.75% solids and reeled up. When subsequently consolidated, the sheet was seen to have a poorer formation than the sheets of Examples 1 and 2, although still acceptable. When consolidated the sheet had a substance of 562 grams per square meter on average (as between machine and cross directions) flexural modulus of 6603 Mega Pascals and tensile strength of 53 Mega Pascals.

Figure 7:
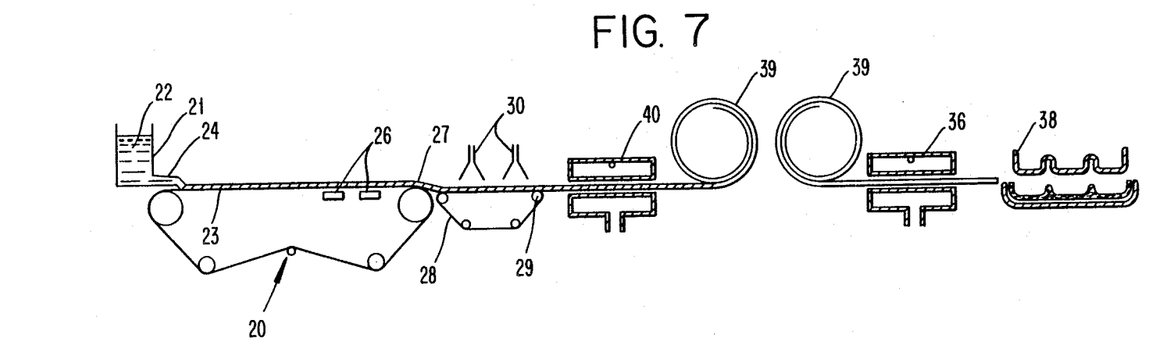

FIG. 7 shows apparatus for carrying out the invention in a somewhat similar way to that shown in FIG. 6 but in this process the drying tunnel 33 is replaced by a hot air oven 40. The general construction of this hot air oven is similar to that shown in FIG. 2 and it is used, in this instance, to provide a drying effect on the web, the hot air passing effectively through the porous material.

Figure 8:
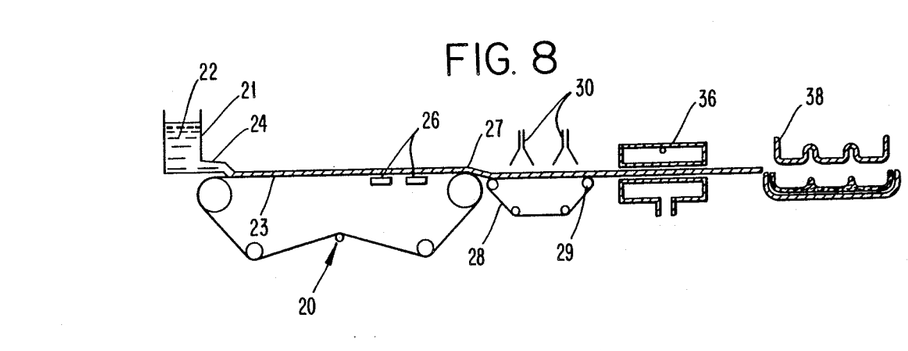

FIG. 8 shows a process somewhat similar to that shown in FIG. 4 but in this construction the endless travelling band 31 and drying tunnel 33 are deleted and the belt 28 delivers the wet material directly into the hot air oven 36 which, not only dries the web but also heats it sufficiently to allow it to be passed directly to the mold 38.

What is claimed is:
1. A process for making a shaped article of fiber reinforced synthetic plastics material comprising the steps of forming a foamed aqueous dispersion comprising from 20% to 60% by weight of single discrete fibers having a modulus of elasticity higher than 10,000 mega pascals, and between 7 and 50 millimeters long, and from 40% to 80% by weight of unconsolidated particulate plastics material selected from the group consisting of a thermoplastic material and a thermosetting material, the particulate plastics material having a particle size of less than about 1.5 millimeters;

laying down and draining said dispersion on a foraminous support so as to form a web;

transferring said web to a heating oven;

heating said web first so as to remove residual moisture therefrom and then so as to bond the fibrous and plastics components together into a self-sustaining permeable sheet while substantially maintaining the particulate form of the plastics material;

transferring said self-sustaining sheet to a through air heating oven;

passing heated air through said sheet so as to cause substantially uniform and homogeneous heating of the components thereof to a temperature at which the viscosity of the thermoplastic constituting the particulate component is sufficiently low to permit the sheet to be molded into a shaped article;

transferring said heated permeable sheet to a compression mold; and subjecting said sheet to a compression molding at a predetermined pressure so as to form a shaped fiber reinforced plastic article.

2. A process as claimed in claim 1 in which the heating oven is a through air heating oven.

3. A process as claimed in claim 1 in which the components are bonded together by surface fusion of the particulate plastics material.

4. A process as claimed in claim 1 in which the components are bonded together by a binder added during formation of the web.

5. A process as claimed in claim 4 in which the binder is selected from the group consisting of polyvinyl alcohol, polyvinyl acetate, carboxymethyl cellulose and starch.

6. A process as claimed in claim 1 in which the fibers are glass fibers having a diameter smaller than about 13 microns.

7. A process as claimed in claim 1 in which the plastics material is a thermoplastic material and is selected from the group consisting of polyethylene, polypropylene, polystyrene, acrylonitrylstyrene butadiene, polyethylene terephthalate, and polyvinyl chloride, both plasticized and unplasticized.

8. A process as claimed in claim 1 in which the degree of bonding is controlled to cohere the components while still retaining sufficient flexibility to permit the structure to be reeled.

9. A process as claimed in claim 1 in which the degree of bonding is controlled to produce a rigid but air permeable sheet.

10. A process as claimed in claim 1 in which the sheet is impregnated with a liquid thermosetting resin before or after molding.

11. A process as claimed in claim 10 in which the resins are selected from the groups consisting of phenol formaldehyde resin, urea and melamine formaldehyde resins, epoxy resins, unsaturated polyesters, polyurethanes and phenolic and polyester resins.

12. A process for making a shaped article of fiber reinforced synthetic plastics material comprising the steps of forming a foamed aqueous dispersion comprising from 20% to 60% by weight of single discrete fibers having a modulus of elasticity higher than 10,000 mega pascals, and between 7 and 50 millimeters long, and from 40% to 80% by weight of unconsolidated particulate plastics material selected from the group consisting of a thermoplastic material and a thermosetting material, the particulate plastics material having a particle size of less than about 1.5 millimeters;

laying down and draining said dispersion on a foraminous support so as to form a web;

transferring said web to a through air heating oven;

passing heated air through said web, first so as to remove residual moisture and then so as to cause substantially uniform and homogeneous heating of the components thereof to a temperature at which the viscosity of the thermoplastic constituting the particulate component is sufficiently low to permit the web to be molded into a shaped article;

transferring said heated web to a compression mold, and subjecting said web to compression molding at a predetermined pressure so as to form a shaped fiber reinforced plastic article.

13. A process as claimed in claim 13 in which the fibers are glass fibers having a diameter smaller than about 13 microns.

14. A process as claimed in claim 13 in which the plastics material is a thermoplastic material and is selected from the group consisting of polyethylene, polypropylene, polystyrene, acrylonitrylstyrene butadiene, polyethylene terephthalate, and polyvinyl chloride, both plasticized and unplasticized.

15. A process as claimed in claim 13 in which the sheet is impregnated with a liquid thermosetting resin before or after molding.

16. A process as claimed in claim 1 in which the resins are selected from the groups consisting of phenol formaldehyde resin, urea and melamine formaldehyde resins, epoxy resins, unsaturated polyesters, polyurethanes and phenolic and polyester resins.

* * * * *